W. L. WHEELER.
Thill-Coupling.

No. 203,096. Patented April 30, 1878.

UNITED STATES PATENT OFFICE.

WILLIAM L. WHEELER, OF BIRMINGHAM, ILLINOIS, ASSIGNOR TO HIMSELF AND WILLIAM NOEL, OF SAME PLACE.

IMPROVEMENT IN THILL-COUPLINGS.

Specification forming part of Letters Patent No. 203,096, dated April 30, 1878; application filed April 5, 1878.

*To all whom it may concern:*

Figure 1:
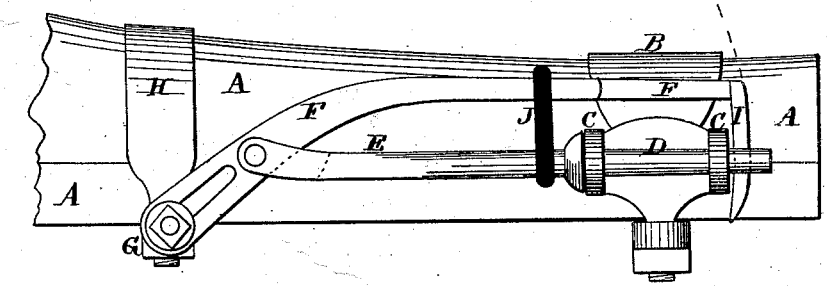
Figure 2:
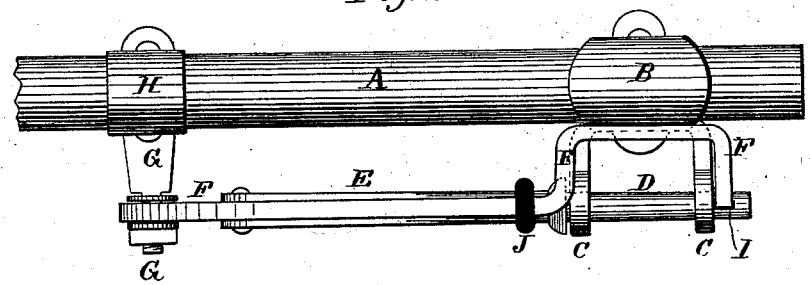

Be it known that I, WILLIAM LEWIS WHEELER, of Birmingham, in the county of Schuyler and State of Illinois, have invented a new and useful Improvement in Thill-Clip Fasteners, of which the following is a specification:

Figure 1 is a front view of my improved device, shown as applied to the axle of a wagon. Fig. 2 is a top view of the same.

The object of this invention is to furnish a simple, convenient, reliable, and safe device for connecting the thill-irons of a thill or tongue with the thill-clips of a wagon in such a way that they may be easily and quickly detached when desired, and which, when attached, will hold the thill or pole securely in place.

The invention consists in the combination of the pin provided with the extension, the pivoted slotted bar provided with a key upon its free end, with the extended yoke of the axle-clip, and with the lugs of the thill-clip, for securing the thill-iron to said clip, as hereinafter fully described.

Similar letters of reference indicate corresponding parts.

A represents the axle of a wagon. B is the thill-clip, upon the forward side of which are formed the lugs C, that receive the thill-iron. D is a bolt or pin that secures the thill-iron to the lugs C. The bolt or pin D is extended inward, and the inner end of the said extension E is pivoted to a bar, F, the inner end of which is slotted to receive the extended forward end of the yoke G of the axle-clip H, where it is secured in place by a nut. The inner end of the bar F is slotted longitudinally to receive the extension of the yoke G, so that the said bar may have a movement upon its pivot as it is operated to draw the pin D E from the lugs C. The outer part of the bar F extends along above the bolt D, and to its free end is attached a key, I, which passes through a hole in the forward end of the pin D, and thus locks the said pin in place. The bar F may be kept from rising by a rubber ring, J, slipped upon it and upon the inward extension E of the pin D, as shown in Figs. 1 and 2, or by any other suitable device.

By this arrangement, by raising the bar F the key I will be withdrawn from the end of the pin D, and the pin D will be withdrawn from the lugs C, allowing the thills or tongue to be readily removed and changed, as desired.

Having thus described my invention, I claim as new and desire to secure by Letters Patent—

The combination of the pin D, provided with the extension E, the pivoted slotted bar F, provided with a key, I, upon its free end, with the extension-yoke G of the axle-clip H, and with the lugs C of the thill-clip, for securing the thill-iron to said clip, substantially as herein shown and described.

WILLIAM LEWIS WHEELER.

Witnesses:
 JOHN W. HOWELL,
 W. P. SAPP.